(12) United States Patent
Wang et al.

(10) Patent No.: US 12,155,096 B2
(45) Date of Patent: Nov. 26, 2024

(54) METHOD FOR FLATTENING PROTON EXCHANGE MEMBRANE FOR FUEL CELL AND APPARATUS THEREFOR

(71) Applicant: Dalian Institute of Chemical Physics, Chinese Academy of Sciences, Liaoning (CN)

(72) Inventors: Suli Wang, Liaoning (CN); Xi Chen, Liaoning (CN); Gongquan Sun, Liaoning (CN)

(73) Assignee: Dalian Institute of Chemical Physics, Chinese Academy of Sciences, Liaoning (CN)

( * ) Notice: Subject to any disclaimer, the term of this patent is extended or adjusted under 35 U.S.C. 154(b) by 881 days.

(21) Appl. No.: 15/733,880

(22) PCT Filed: Dec. 13, 2019

(86) PCT No.: PCT/CN2019/125122
§ 371 (c)(1),
(2) Date: Nov. 30, 2020

(87) PCT Pub. No.: WO2021/114225
PCT Pub. Date: Jun. 17, 2021

(65) Prior Publication Data
US 2021/0367244 A1 Nov. 25, 2021

(30) Foreign Application Priority Data
Dec. 11, 2019 (CN) .......................... 201911267441.7

(51) Int. Cl.
*H01M 8/0271* (2016.01)
*H01M 8/0293* (2016.01)
(Continued)

(52) U.S. Cl.
CPC ....... *H01M 8/0271* (2013.01); *H01M 8/0293* (2013.01); *H01M 8/1004* (2013.01);
(Continued)

(58) Field of Classification Search
CPC ............ H01M 8/0271; H01M 8/0293; H01M 8/1004; H01M 8/1018; H01M 8/1069; H01M 8/1093; Y02P 70/50
See application file for complete search history.

(56) References Cited

U.S. PATENT DOCUMENTS

2002/0144394 A1* 10/2002 Uchida ............... H01M 8/1004
29/623.5
2007/0111072 A1* 5/2007 Wayne ................... C08J 5/2293
429/534

(Continued)

FOREIGN PATENT DOCUMENTS

CN 204464351 U 7/2015
CN 205069728 U 3/2016
(Continued)

*Primary Examiner* — Matthew T Martin
*Assistant Examiner* — Taylor Harrison Krone
(74) *Attorney, Agent, or Firm* — NKL Law; Allen Xue

(57) ABSTRACT

A method for flattening the proton exchange membrane for the fuel cell and an apparatus therefor are used in flattening the proton exchange membrane which is soaked with phosphoric acid. The control precision of this method can be higher than the traditional adsorption method. The mechanical transfer of proton exchange membrane can be realized so that the processing efficiency of proton exchange membrane in the process of fuel cell membrane electrode assembly is greatly improved.

5 Claims, 1 Drawing Sheet

(51) Int. Cl.
*H01M 8/1004* (2016.01)
*H01M 8/1018* (2016.01)
*H01M 8/1069* (2016.01)
*H01M 8/1086* (2016.01)

(52) U.S. Cl.
CPC ....... *H01M 8/1018* (2013.01); *H01M 8/1069* (2013.01); *H01M 8/1093* (2013.01); *Y02P 70/50* (2015.11)

(56) References Cited

U.S. PATENT DOCUMENTS

| | | | |
|---|---|---|---|
| 2011/0265669 A1* | 11/2011 | Padberg | H01M 8/1093 |
| | | | 429/535 |
| 2017/0033384 A1* | 2/2017 | Cho | B32B 37/0053 |
| 2019/0372135 A1 | 12/2019 | Joye | |

FOREIGN PATENT DOCUMENTS

| | | |
|---|---|---|
| CN | 205264813 U | 5/2016 |
| CN | 109049649 A | 12/2018 |

* cited by examiner

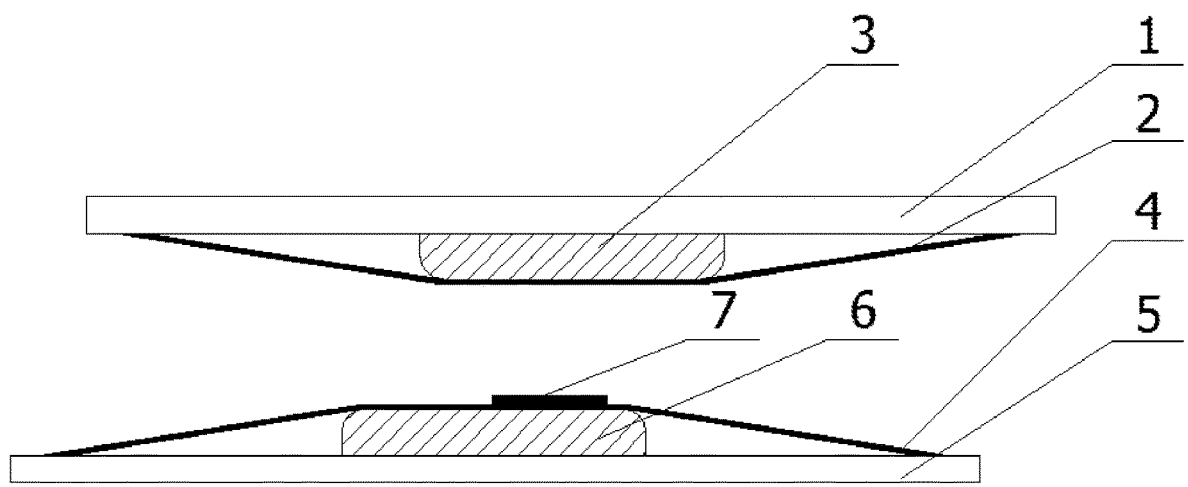

METHOD FOR FLATTENING PROTON EXCHANGE MEMBRANE FOR FUEL CELL AND APPARATUS THEREFOR

FIELD OF TECHNOLOGY

The disclosure relates to the technical field of fuel cell and, more specifically, provides a method and apparatus for flattening a proton exchange membrane of a fuel cell.

BACKGROUND OF THE INVENTION

A fuel cell is an energy conversion device that converts the chemical energy stored in $H_2$ and $O_2$ directly into electrical energy. The transformation process is not restricted by Carnot cycle process, so that it has high energy conversion efficiency. In addition, fuel cell also has the characteristics of noiseless, vibration-free, clean emission, environmentally friendly and modularized layout, which provide fuel cell technology a broad application prospect in the fields of new energy vehicles and distributed power stations. The proton exchange membrane of the membrane electrode assembly (MEA) is one of the core regions of electrochemical reaction, which is mainly composed of polymer. As the main medium of proton transfer in the fuel cell, the electrolyte in the proton exchange membrane directly affects its performance and life. For the proton exchange membrane obtained by post-impregnation method, its physical form is relatively soft and difficult to flatten. Meanwhile, a great deal of electrolyte solution remains on the surface so that a part of the surface electrolyte solution has to be removed to obtain an electrolyte solution compatible with the gas diffusion layer in the membrane electrode assembly.

At present, the treatment methods are mainly manual flattening and a porous material to adsorb electrolyte from the surface. There are some problems such as uneven leveling, uneven distribution of electrolyte solution and low production efficiency. Uneven distribution of electrolyte solution leads to uneven distribution of electrode current density, which affects consistency and life of the membrane electrode assembly. Low production efficiency directly affects the industrialization process of fuel cells. No similar research has been carried out on the efficient control methods and apparatus. Based on the above, the disclosure presents a method and apparatus for flattening a proton exchange membrane of a fuel cell membrane electrode units. This method can realize the efficient and rapid processing of fuel cell membrane electrode proton exchange membrane and improve the uniform consistency of electrolyte solution, which will be of great significance to promote the industrialization process of fuel cell.

SUMMARY OF THE INVENTION

The disclosure provides methods and apparatus for flattening a proton exchange membrane for a fuel cell membrane electrode assembly. By the liquid surface tension on the surface of the proton exchange membrane, one end of the proton exchange membrane is preferably separated from the substrate surface through the relative movement between the two tension surfaces so as to transfer the proton exchange membrane to the another surface after the movement. When the two tension surfaces move relatively to each other, the electrolyte solution on the surface of the proton exchange membrane is evenly distributed on the surface through the applied pressure and friction, so as to achieve the goal of flattening and even distribution of the electrolyte.

To achieve above objectives, the disclosure adopts the following technical scheme: an apparatus includes the first plate and the second plate, and the first plate is placed over the second plate and the lower surface of the first plate is covered with the first protective film. The first sliding block, which has a flat lower surface, is disposed between the first plate and the first protective film. The first sliding block can slide back and forth along the lower surface of the first plate. The second protective film is disposed on the upper surface of the second plate. Likewise, the second sliding block, whose the upper surface is flat, is disposed between the second plate and the second protective film. The second sliding block can slide back and forth along the upper surface of the second plate. The first protective film and the second protective film are opposed to each other, and the first sliding block and the second sliding block are opposed to each other.

The flattening method of proton exchange membrane is as follows:

1) The proton exchange membrane to be flattened is soaked with liquid on its upper and lower surfaces, and is placed on the second protective film, so that the proton exchange membrane is located above the second sliding block.
2) Move the first plate downward so that the first protective film is in contact with the proton exchange membrane to be flattened, and the proton exchange membrane to be flattened is located beneath the first sliding block. Apply a pressure between the first sliding block and the second sliding block.
3) Slide the second sliding block to the left or right to separate it from the proton exchange membrane. The proton exchange membrane is transferred to the lower surface of the first protective film and underneath the first sliding block.
4) Move the first plate to the placement area of proton exchange membrane after flattening that has a flat surface. Apply a pressure between the first sliding block and the upper surface of the placement area.
5) Slide the first sliding block to the left or right so that the first sliding block is separated from the top of the proton exchange membrane. After flattening, the proton exchange membrane is transferred to the upper surface of the placement area.

The liquid soaking the proton exchange membrane is a phosphoric acid solution with a mass concentration of 70-95%.

The pressures described in steps 2) and 4) are 50-500N.

In step 3), when the proton exchange membrane to be flattened is located below the first sliding block, the first plate, together with the first sliding block, the first protective film, and the proton exchange membrane are moved by a mechanical part to a placement area where pictures can be taken, identifying the position the proton exchange membrane relative to the first protective film by CCD.

The placement area in step 4) is where the membrane electrode assembly is being assembled. And the position of the said flattened proton exchange membrane on the assembly position of the membrane electrode directly face the membrane electrode assembly to be assembled.

The method to align the flattened proton exchange membrane on the assembly position of the membrane electrode assembly is as follows: by controlling the mechanical part to place the proton exchange membrane directly above the electrode to be assembled according to the position recognized by the CCD.

The apparatus used for flattening the proton exchange membrane includes the first plate and the second plate, and the first plate is disposed above the second plate. The lower surface of the first plate is the first protective film. The first sliding block, whose the lower surface is flat, is disposed between the first plate and the first protective film. The first sliding block can slide back and forth along the lower surface of the first plate. The second protective film is on the upper surface of the second plate. Likewise, the second sliding block, whose the upper surface is flat, is disposed between the second plate and the second protective film. The second sliding block can slide back and forth along the upper surface of the second plate. The first protective film and the second protective film are opposed to each other, and the first sliding block and the second sliding block are opposed to each other. The upper surface of the first plate is the placement area where the flattened proton exchange membrane is placed.

The first plate is connected to the driving force output end of the first driving device. The first plate is driven up and down or left and right by the first driving device. The first sliding block and the second sliding block are respectively connected to driving force outputs of the second driving device, and are driven to move left and right by the second driving device.

The first driving device is a motor whose output shaft is connected with the first plate. The second driving device is a motor or a cylinder, and the motor output shaft or the cylinder output rod is connected to the first sliding block and the second sliding block.

The apparatus also includes a CCD identification system that can photograph and identify the proton exchange membrane located below the first sliding block and its relative position on the lower surface of the first plate, and generate a control signal which can make the first driving device move the first plate to the specified placement area. By controlling the moving position of the first plate, the electrode to and the proton exchange membrane are to be assembled at the specified location.

Thus, the flattening and rapid movement of the electrolyte membrane can be realized. Compared with the traditional manual flattening method, the system of the current disclosure can shorten the service time from 1-2 min to 10-30 s, and compared with the membrane electrode assembly using the traditional manual flattening, the precision of the membrane electrode assembly can be improved from ±0.5 mm to ±0.02 mm, which greatly improves the processing efficiency of proton exchange membrane and provides a method for automatic and intelligent preparation of membrane electrode units.

DESCRIPTION OF DRAWINGS

The FIGURE shows the assembly diagram of the disclosure;
1: first plate, 2: first protective film, 3. first sliding block, 4. second protective film, 5. second plate, 6. second sliding block, 7. proton exchange membrane.

DETAILED DESCRIPTION

The apparatus used in the flattening method includes the first plate 1 and the second plate 5, and the first plate 1 is placed over the second plate 5 and the lower surface of the first plate 1 is covered with the first protective film 2. The first sliding block 3, which has a flat the lower surface, is disposed between the first plate 1 and the first protective film 2. The first sliding block 3 can slide back and forth along the lower surface of the first plate 1. The second protective film 4 is disposed on the upper surface of the second plate 5. Likewise, the second sliding block 6, whose the upper surface is flat, is disposed between the second plate 5 and the second protective film 4. The second sliding block 6 can slide back and forth along the upper surface of the second plate 5. The first protective film 2 and the second protective film 4 are opposed to each other, and the first sliding block 3 and the second sliding block 6 are opposed to each other. The upper surface of the first plate 1 is the placement area where the flattened proton exchange membrane 7 is placed.

The first plate 1 is connected to the driving force output end of first driving device. The first plate 1 is driven up and down or left and right by the first driving device. The first sliding block 3 and the second sliding block 6 are respectively connected to driving force output end of the second driving device, and are driven to move left and right by the second driving device.

The first driving device is a motor whose output shaft is connected with the first plate 1.

The second driving device is a motor or a cylinder, and the motor output shaft or the cylinder output rod is connected to the first sliding block 3 and the second sliding block 6.

The apparatus also includes a CCD identification system that can photograph and identify the proton exchange membrane 7 located below the first sliding block 3 and its relative position on the lower surface of the first plate 1, and generate a control signal which can make the first driving device move the first plate 1 to the specified placement area. By controlling the moving position of the first plate, the electrode and the proton exchange membrane are to be assembled at the specified location.

The flattening method of proton exchange membrane is as follows:
1) The proton exchange membrane to be flattened 7 is soaked with liquid on the upper and lower surfaces, and is placed on the second protective film 4 so that the proton exchange membrane 7 is located above the second sliding block 6.
2) Move the first plate 1 downward so that the first protective film 2 is in contact with the proton exchange membrane to be flattened 7, and the proton exchange membrane 7 which is to be flattened is located beneath the first sliding block 3. Apply a pressure between the first sliding block 3 and the second sliding block 6.
3) Slide the second sliding block 6 to the left or right to separate it from the proton exchange membrane 7. The proton exchange membrane 7 is transferred to the lower surface of the first protective film 2, and underneath the first sliding block 3.
4) Move the first plate 1 to the placement area of proton exchange membrane 7 after flattening that has a flat surface. Apply a pressure between the first sliding block 3 and the upper surface of the placement area.
5) Slide the first sliding block 3 to the left or right so that the first sliding block 3 is separated from the top of the proton exchange membrane 7. After flattening, the proton exchange membrane is transferred to the upper surface of the placement area.

The liquid soaking proton exchange membrane is a phosphoric acid solution with a mass concentration of 70-95%.
The pressures described in steps 2) and 4) are 50-500N.

In step 3), when the proton exchange membrane 7 is located below the first sliding block, the first plate 1, together with the first sliding block 3, the first protective film 2, and the flatten proton exchange membrane 7 are moved by a mechanical part to a placement area where pictures can be taken, identifying the position the proton exchange membrane 7 relative to the first protective film 2 by CCD.

The placement area in step 4) is where the membrane electrode assembly is being assembled. And the position of the said flattened proton exchange membrane 7 on the assembly position of the membrane electrode directly faces the membrane electrode assembly to be assembled.

The method to align the flattened proton exchange membrane 7 on the assembly position of the membrane electrode assembly is as follows: by controlling the mechanical part to place the proton exchange membrane 7 directly above the electrode to be assembled according to the position recognized by the CCD.

As such, the flattening and rapid movement of the electrolyte membrane can be realized. Compared with the traditional manual flattening method, the system of the current disclosure can shorten service time from 1-2 min to 10-30 s, and compared with the traditional manual membrane electrode flattening, the precision of the membrane electrode assembly can be improved from ±0.5 mm to ±0.02 mm, which greatly improves the processing efficiency of proton exchange membrane and provides a method for automatic and intelligent preparation of membrane electrode assembly.

We claim:

1. A process to flatten a proton exchange membrane for a fuel cell prior to applying an electrode thereon, comprising:
    assembling an apparatus that comprises a first plate, a second plate, a first sliding block, and a second sliding block,
        wherein the first plate is disposed over the second plate,
        a lower surface of the first plate is covered with a first protective film,
        the first sliding block has a flat lower surface and is disposed between and in direct contact with both the first plate and the first protective film, configured to slide back and forth along the lower surface of the first plate,
        an upper surface of the second plate is covered with a second protective film,
        the second sliding block has a flat upper surface and is disposed between and in direct contact with both the second plate and the second protective film, configured to slide back and forth along the upper surface of the second plate;
    placing a proton exchange membrane soaked with a liquid on the upper surface and the lower surface thereof on the second protective film so that the proton exchange membrane is located above the second sliding block;
    moving the first plate downward so that the first protective film is in direct contact with the proton exchange membrane and the proton exchange membrane is located beneath the first sliding block, and applying a first pressure between the first sliding block and the second sliding block;
    sliding the second sliding block along the upper surface of the second plate until the proton exchange membrane is separated from the second protective film and attached to the first protective film underneath the first sliding block;
    moving the first plate to a placement area and applying a second pressure between the first sliding block and an upper surface of the placement area; and
    sliding the first sliding block until the proton exchange membrane is separated from the second protective film and disposed on the upper surface of the placement area.

2. The flattening method according to claim 1, wherein the liquid soaking the proton exchange membrane is a phosphoric acid solution with a mass concentration of 70-95%.

3. The flattening method according to claim 1, wherein the first and the second pressures are in the range of 50 N to 500N.

4. The flattening method according to claim 1, further comprising taking a picture of the proton exchange membrane on the placement area to identify a position thereof, and
    the placement area is where a membrane electrode assembly is being assembled.

5. The flattening method according to claim 4, further comprising, after identifying the position of the proton exchange membrane on the placement area, aligning the proton exchange membrane with the membrane electrode.

* * * * *